Nov. 6, 1962

W. H. PERCIVAL 3,062,000

SUBMARINE PROPULSION SYSTEM

Filed March 10, 1961

INVENTOR.
Worth H. Percival
BY
E. W. Christen
ATTORNEY

INVENTOR.
Worth H. Percival
BY
ATTORNEY

United States Patent Office 3,062,000
Patented Nov. 6, 1962

3,062,000
SUBMARINE PROPULSION SYSTEM
Worth H. Percival, New Baltimore, Mich., assignor to General Motors Corporation, Detroit, Mich., a corporation of Delaware
Filed Mar. 10, 1961, Ser. No. 94,922
3 Claims. (Cl. 60—6)

This invention relates to propulsion systems, and more particularly to a propulsion system and power plant for marine use, either on the surface or under the surface.

In the propelling and propulsion systems for objects such as boats or submarines, it is the usual practice to provide a system which is operated by steam or nuclear power for surface operation, and in the case of submarines to use either battery power or nuclear power for under-surface operation. Submarines utilizing battery operation for under-surface use generally have a very limited range of operation and are relatively expensive to operate. In submarine warfare these are very definite disadvantages. Nuclear power is a solution to some of these problems. However, the attendant safety problems and size requirements, as well as cost, make such power inapplicable to small size submarines. The basic difficulty with under-surface operation is the fact that combustion type engines cannot be used because of the lack of available oxygen necessary for the combustion process. The usual submarine operated under battery power must surface periodically to recharge the batteries, operating under a separate system, such as steam or diesel power, during the recharging phase. The range of the submarine for under-surface operation under these conditions is relatively limited because of the types of batteries presently available.

The device in which this invention is embodied comprises, generally, a silent propulsion system and power plant which may be utilized in a submarine of any size and which permits an extended under-surface operation range without requiring surfacing and recharging as often as with presently available systems. The proposed propulsion system comprises, generally, a heat engine, such as a Stirling cycle engine; a thermal storage tank, permitting the storage of a great amount of heat for operating the heat engine; a compressor and turbine for recharging the thermal storage tank when necessary; and necessary burners, blowers, valves and heat transfer devices.

The system permits under-surface operation for an extended period of time and the heat engine is adaptable to operate the craft either under the surface or above the surface, and either without external combustion or with external combustion, as the circumstances dictate. The system is silent due to the advantages of the heat engine, and the system may be adapted to any size craft by merely adding heat engine components to increase the power along with required additions to the size of the various parts.

These and other advantages will become more apparent from the following description and drawings, in which.

Figure 1:
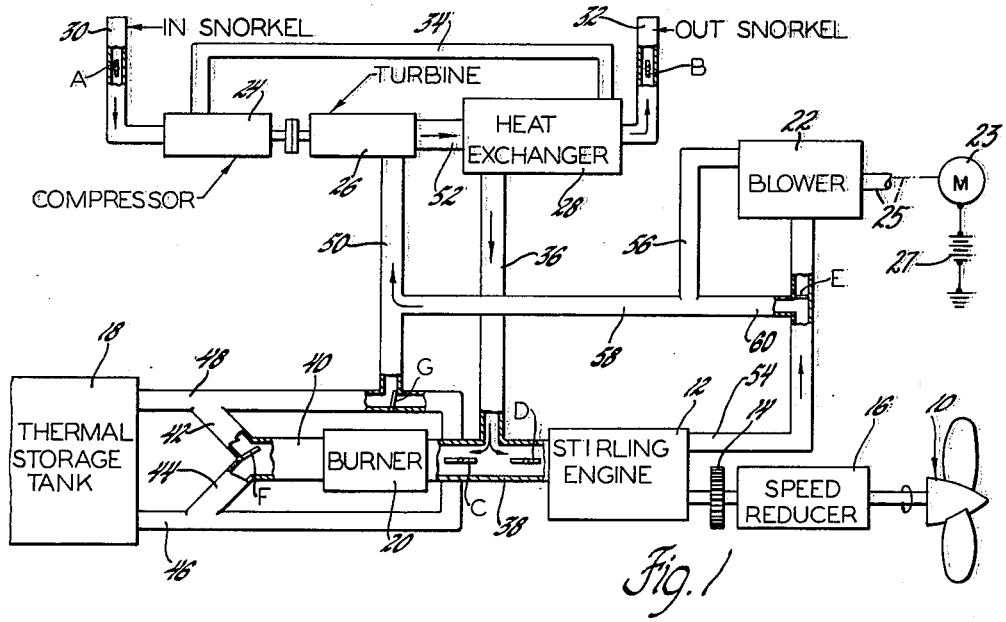
FIGURE 1 is a schematic illustration of the proposed propulsion system, illustrating the communication between the various parts thereof.

FIGURE 1 best illustrates the general propulsion system and schematically illustrates the connections and communications between the various parts thereof. As illustrated in FIGURE 1, the propeller or driving device 10 is operated by a heat engine 12, which may be a typical Stirling cycle type heat engine and which will be hereinafter more fully described. A plurality of such engines may be utilized, being combined through suitable clutch linkages and drive gear 14, and proper speed reduction to the propeller 10 may be provided through a conventional unit 16. A thermal storage tank 18 is used in the system to provide operating heat for the Stirling engine 12, as will be more fully hereinafter described. A combustion type burner unit 20, which may be conventional in nature and operable on a suitable economical fuel, such as diesel fuel, provides the necessary heat to charge the storage tank 18. A blower 22, also of a conventional type, is provided to circulate fluid through the system during under-surface operation. A compressor 24, suitably connected to a turbine 26, brings fluid into the system in a manner to be more fully described for surface operation, and a heat exchanger 28, also of conventional construction, aids in balancing the thermal properties of the system.

In order to operate blower 22 during under-surface operation any conventional method may be employed. For example, a small electric motor 23, operably connected to blower 22 by a shaft 25, may be operated from a suitable storage battery, as 27. These components would be of sufficient size to permit convenient storage in the vessel and are conventional in construction and operation.

In the schematic illustration of FIGURE 1, conduit 30 represents the snorkel air inlet conduit provided with valve A to permit the entry of air for surface or snorkelling operation. Conduit 30 communicates directly with compressor 24 for the entry of such air to the system. Conduit 32 is a snorkel air outlet pipe leading from heat exchanger 28 and having valve B disposed therein to close the conduit 32 during under-surface operation. Pipe 34 leads from the compressor 24 to the heat exchanger 28, heat exchanger 28 adding heat to the incoming air from snorkel inlet 30 to aid in balancing the system. Conduit 36 leads from the heat exchanger to conduit 38, conduit 38 being provided with valves C and D and extending transverse to conduit 36. The portion of conduit 38 containing valve C leads to the tank burner 20, and from the tank burner conduit 40 terminates in Y sections 42 and 44. Valve F disposed in the yoke of the Y is adapted to divert air through either conduit 42 or 44, as desired. This will be more fully described. Tank 18 is provided with inlet and outlet conduits 46 and 48 connecting with the Y portions 42 and 44, and valve G located in the conduit 46—48 acts in conjunction with valve F, as desired. Conduit 50 extends from conduit 48 to the turbine 26 and air passing therethrough is adapted to drive the turbine and thus operate compressor 24. Conduit 52 extends between the turbine 26 and the heat exchanger 28 and communicates with outlet snorkel tube 32. The opposite portion of conduit 38, which contains valve D, passes to the Stirling engine 12 and conveys air around the heater tubes of the engine 12 for purposes to be later described. Outlet conduit 54 from the Stirling engine leads to a blower 22, blower 22 being adapted to circulate air through the system during submerged operation. Blower outlet conduit 56 communicates with a conduit 58, in turn communicating with conduit 50 which leads to the turbine 26. A bypass portion 60 extends from engine outlet conduit 54 to conduit 58, and valve E is disposed at the connection between conduit 60 and conduit 54 to divert the air in the desired direction.

The operation and various phases of the propulsion system, as illustrated in FIGURE 1, will be described below, following a description of the important parts of the system.

Figure 2:
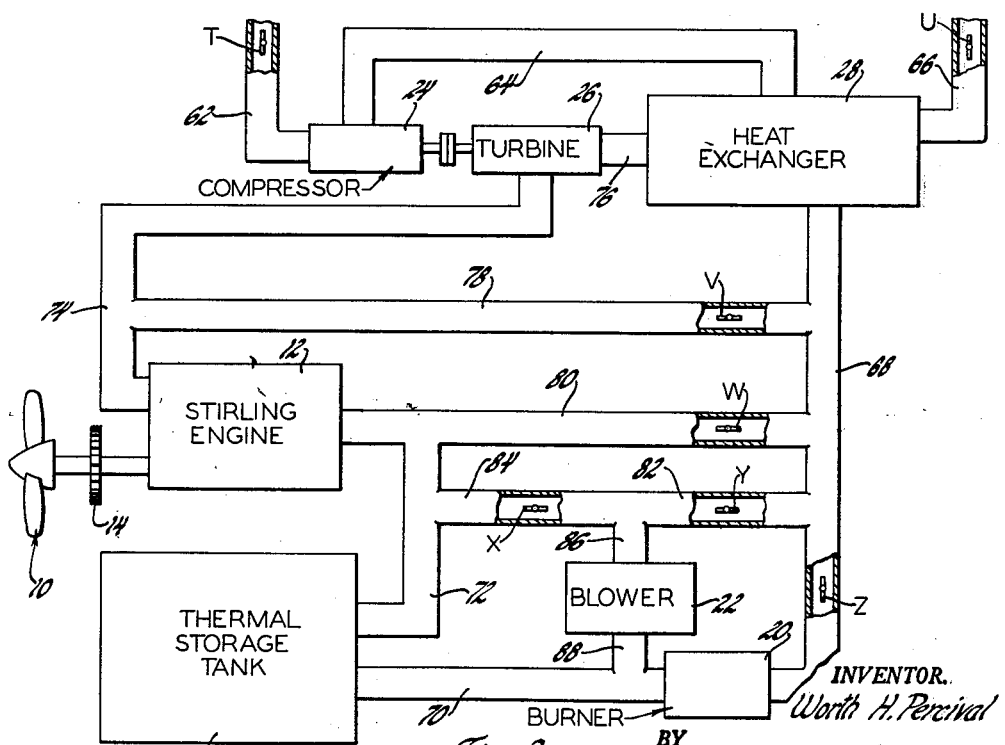
FIGURE 2 is a schematic illustration of a modification of the propulsion system shown in FIGURE 1.

A modification of the propulsion system is illustrated schematically in FIGURE 2 having generally the same parts and the same reference numerals with the exception of the piping and valves. This system comprises a snorkel inlet conduit 62 having valve T disposed therein leading to compressor 24. Conduit 64 leads from the compressor to the heat exchanger 28, and conduit 66 is the snorkel outlet tube having valve U disposed therein. Conduit 68 extends from the heat exchanger 28 to the tank burner 20, and valve Z is disposed in the conduit as illustrated. Conduit 70 leads from the burner 20 to the thermal storage tank 18, and conduit 72 leads from the thermal storage tank 18 to the heat engine 12. The outlet from the heat engine is conduit 74 which extends to the turbine 26, and conduit 76 conveys the air from the turbine 26 through the heat exchanger 28 and into the snorkel outlet 66. A conduit 78 communicates with conduit 68 and has valve V disposed therein. Conduit 80 communicates between conduit 68 and conduit 72 and has valve W disposed therein. Conduit 82, having valve Y therein, and conduit 84, having valve X therein, form a junction with conduit 86 leading to the blower 22. Blower 22 may be operated in any convenient manner, such as by an electric motor as above described with reference to the blower drive of FIGURE 1. Conduit 82 communicates with conduit 68, and conduit 84 communicates with conduit 72, the purpose for which will be later described. Blower outlet conduit 88 communicates with conduit 70 between the burner 20 and the storage tank 18. The operation and the various cycles of the system illustrated in FIGURE 2 will be more fully described following a description of the more important parts of the system.

Figure 3:
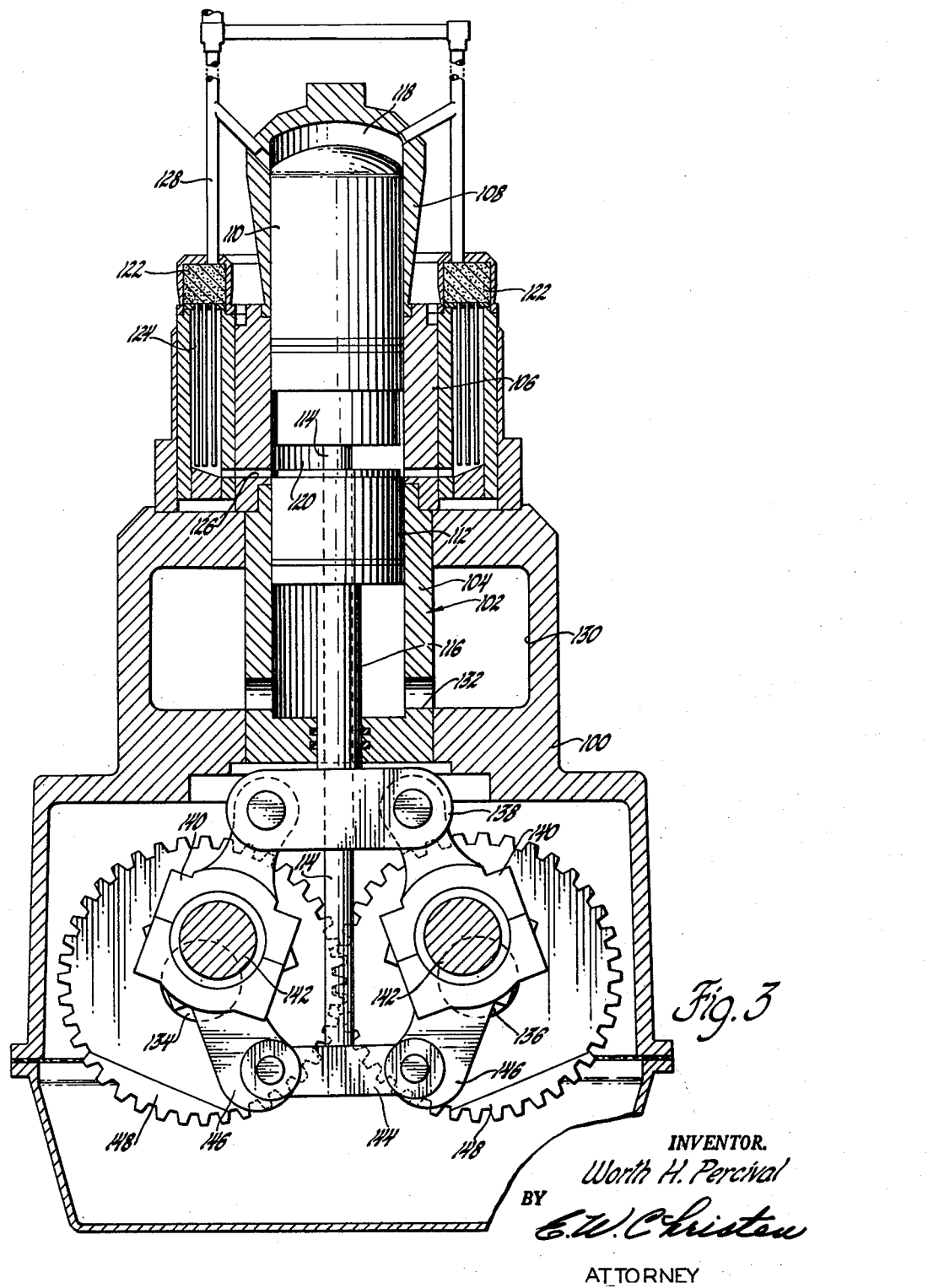
FIGURE 3 is an illustration showing a typical heat engine of the Stirling cycle type.

FIGURE 3 of the drawings illustrates a typical engine of the Stirling cycle type which may form a part of the proposed system. In putting this system into practice it is to be noted that a plurality of such engines would be used in any suitable form in order to provide the required power for driving the submarine. However, additional units or cylinders would be substantially the same as that illustrated in FIGURE 3. As illustrated in the figure, the engine is provided with a frame or crankcase 100 in which is mounted a cylinder construction, indicated generally by the numeral 102. This construction may include parts 104, 106 and 108. A displacer piston 110 operates in the upper portion of the cylinder 102 and a working or power piston 112 operates in the lower portion of cylinder 102. Displacer piston 110 is provided with a piston rod 114, and power piston 112 is provided with a piston rod 116. Piston rod 114 is adapted to pass through and be coaxial with piston rod 116, extending downwardly through the cylinder 102 and into the crankcase 100. A working fluid, such as hydrogen, is transferred from a hot space 118 above the displacer piston to a cold space 120 between the displacer piston 110 and the power piston 112 through a series of regenerator cups or the like 122, in the conventional manner. Regenerator devices 122 take heat from the fluid and retain such heat, the cooled fluid passing through cooler unit 124 to the cold space 120 passing through the cylinder wall by means of passage 126. Heater tubes 128 located about the upper portion of the cylinder 102 convey the hot fluid from the hot space 118 to the regenerators 122, tubes 128 being heated by a suitable heat source in order to maintain the required heat in the working fluid. The heat source may take the form of a combustion type burner, heating the area around the heater tubes 128, or may take the form of a flow of heated fluid passing around the heated tubes 128. The engine operates by means of the transfer of heat and the thermodynamic properties of the working fluid and the properly phased motion of the displacer piston 110 and power piston 112. Crankcase 100 is provided with a suitable buffer space 130 communicating with the interior of cylinder 102 below the power piston 112 through apertures or conduits 132.

A conventional drive mechanism is provided in the crankcase 100 for taking power from the engine. The drive mechanism comprises, generally, a pair of crankshafts 134 and 136 and from which a single power output is taken. A yoke 138 is secured to power piston rod 116, and crank arms 140 extend from yoke 138 to the crankthrows 142 on the crankshaft 136. A second yoke 144 is secured to the lower end of the displacer piston rod 114 and is connected by crank arms 146 to suitable crankthrows 142 on the crankshafts 134. Gears 148, also mounted on crankshafts 134, provide the proper balance and power transmission, and maintain the proper phase between crankshafts 134.

As above stated, a plurality of such engines might be utilized, or a plurality of cylinders comprising a single engine in any suitable manner may be used. In such a case the power driving shaft would be suitably connected to crankshafts 134 and 136.

Figure 4:
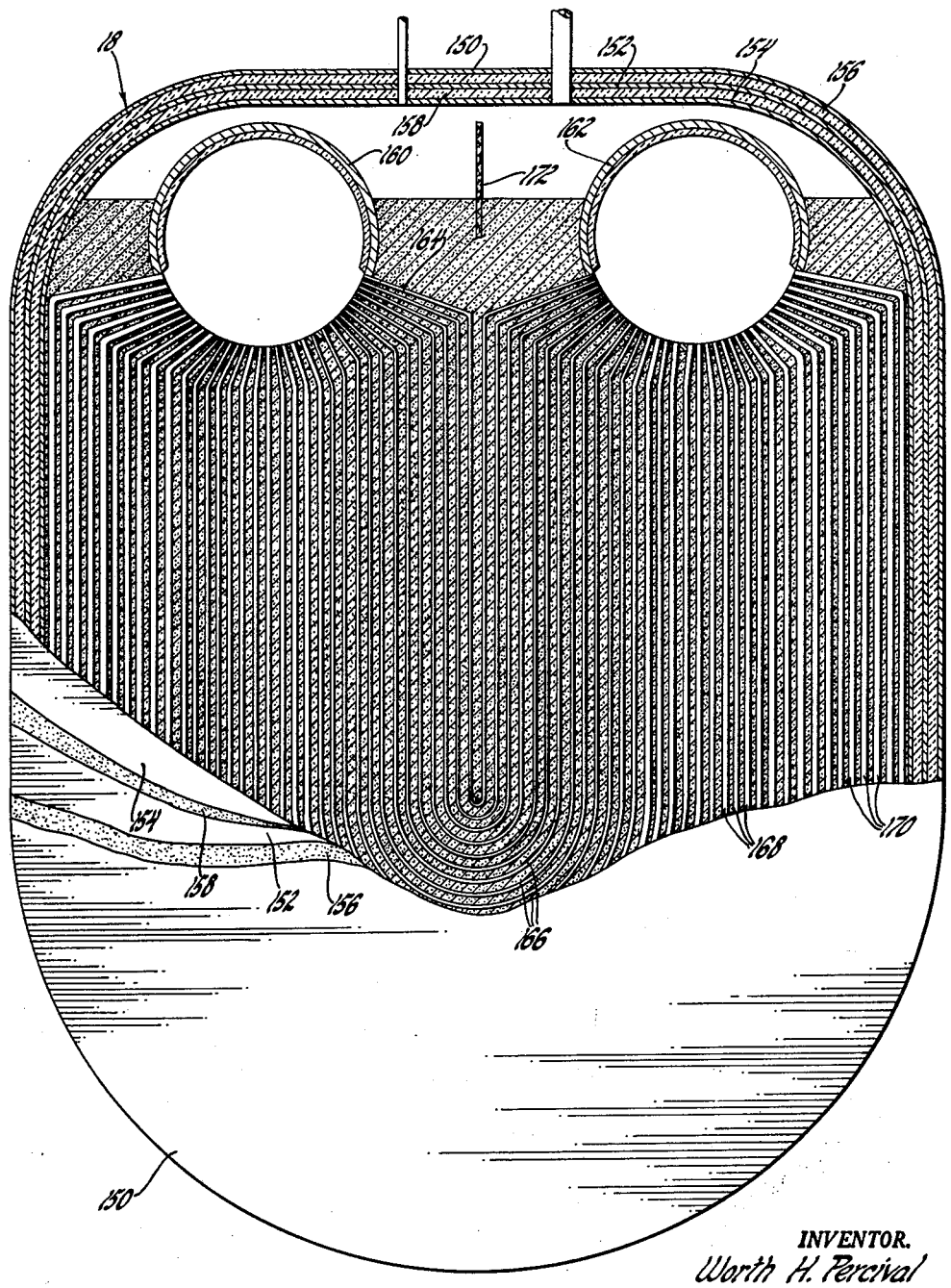
FIGURE 4 is a view with parts broken away and in section of a heat storage tank suitable for use in the propulsion system illustrated in FIGURES 1 and 2.

Referring to FIGURE 4, the heat storage tank 18 of the schematic systems of FIGURES 1 and 2 is shown to include a plurality of shells 150, 152 and 154. The shells are separated by suitable layers of insulation 156 and 158 in order to minimize the heat transfer from the interior of the tank to the atmosphere. Passing through the tank 18 are a pair of header pipes 160 and 162 having a plurality of U-shaped tubes 164 extending therebetween. Surrounding a portion of the header pipes 160 and 162 and completely surrounding the U-shaped tubes 164 is a heat storage material of some suitable nature which will absorb heat transferred thereto through the header pipes 160 and 162 and the U-shaped pipes 164. This material may be any suitable compound, and such materials as lithium hydride, lithium hydroxide and lithium fluoride have been found to meet the requirements. Such requirements include low vapor pressure at maximum operating temperature, high heat capacity, a melting point at the maximum operating temperature, and a high latent heat of fusion, and further including high density, chemical stability at all temperatures, noncorrosive properties, rechargeability and noncombustibility. The preferred material for use in the proposed system is lithium fluoride although many other compounds might be used, each having its own advantages and disadvantages.

The space between the upper surface of the heat storage medium and the top of the tank 18 may be provided with an inert atmosphere, as by filling with argon gas, for protective reasons.

Since the U-shaped tubes 164 have unequal lengths and in order to provide for optimum heat transfer, the diameters of groups of tubes are varied. It is preferred that the diameters increase from the inside rows of tubes toward the outside rows, in order to keep the length over diameter ratios as nearly the same as possible. This may be done by providing three-eighths inch outside diameter tubes on the inner third of the rows, illustrated at 166; one-half inch diameter tubes in the center third of the rows, illustrated at 168; and three-fourths inch diameter tubes in the outer third of the rows, illustrated at 170.

In order to protect the tank from possible leakage, due to a puncture or the like, and to prevent draining of the entire tank from a single puncture, a series of baffles 172 may be suitably secured laterally across the tank, dividing the tank into essentially separate containers.

In order to uniformly heat the lithium fluoride in the tank 18, burner 20 is provided adjacent the tank. The burner may be of any conventional nature operating on the combustion of a suitable fuel, such as diesel fuel, and heating the incoming air to pass through the header pipes 160 and 162 and the U-shaped tubes 164. It is preferred that the temperature of the products of combustion be sufficient to heat the material in the storage tank to a temperature in the neighborhood of 1600° F. A burner operating between the approximate 1800° F. and 2000° F. may be sufficient for this purpose. It is proposed that two of such burners be placed adjacent the tank 18 and leading directly to header pipes 160 and 162, respectively. In this manner overheating of the material adjacent one of the header pipes will be avoided by operating first one burner and then the other, and thus transferring the incoming heat to first one header pipe and then the other. By alternating the burners during the charging process, the material adjacent opposite header pipes will be more uniformly heated.

The operation of the propulsion system illustrated in FIGURE 1 may be divided into several phases. These would include submerged operation, surface running, surface recharging, and surface running and recharging. For submerged operation of the submarine valves A and B in the snorkel tubes 30 and 32, respectively, would be closed. The blower 22 is started in some suitable manner, as by the small electric motor 23, and air is circulated through the system. Valve E is placed in its lowered position, i.e., closing the entry to conduit 60, and valves C and D in conduit 38 are open. The tank burner 20 and the Stirling engine burner are shut off and valve F may be in either the up or down position. If valve F is in the up position, the valve G must be to the right, as viewed in FIGURE 1. If valve F is in the down position, the valve G must be to the left. Air is circulated by the blower 22 through conduits 56, 58 and 50 to the thermal storage tank 18 and into one of the header pipes 160 or 162. Air then passes out of the tank 18 from the other header pipe through conduits 46 and 44 and through the burner 20 into conduit 38. The heated air passes to the Stirling engine and about the heater tubes 128 to act as a heat source for operating the engine 12. The air leaves the Stirling engine 12 through conduit 54 and is recirculated by the blower 22. Propeller 10 is rotated by the power taken from the Stirling engine combination through gear 14 and speed reducer 16. It is to be noted that the compressor, turbine and heat exchanger are inoperative, as well as the tank burner and Stirling engine burner, during the submerged operation.

The second phase of operation of the system is to recharge the storage tank 18 upon surfacing of the submarine or during snorkelling conditions. Here valves A and B in the snorkel tubes would be open and burner 20 adjacent tank 18 would be operating. Incoming air is taken through the snorkel tube 30 to the compressor 24, the turbine compressor unit being started by some suitable auxiliary power source. The air is passed through conduit 34 to the heat exchanger 28 where it picks up a certain amount of resident heat and passes through conduit 36 to conduit 38. For merely recharging, valve D is closed and valve C is open, the air being conducted through the burner 20 into conduit 40 and, depending upon the position of valve F, to the tank through either conduit 46 or 48. If valve F is up, the air will pass from the burner to the tank from conduit 46 and will come out of the tank through conduit 48 and will pass to turbine 26 through conduit 50, valve G being in the right position to prevent by-passing air from conduit 46 directly to conduit 50. During the recharging operation, valves F and G may be alternated to direct the hot gases from one header pipe to the other for more balanced heating of the material in the tank. The hot gases leaving the tank through conduit 48 and passing to turbine 26 will have a temperature between approximately 1100° F. and 1600° F., depending on the degree of charging of the material in the tank, and the turbine is thus driven by the expanding gas to drive the compressor 24. Gas then passes through conduit 52 to the heat exchanger 28, where most of the heat is removed, and the gas passes through conduit 32 to the atmosphere.

The third phase of the operation is the surface running or snorkel running of the submarine. Under these conditions it is assumed that the tank is fully charged and valves A and B in the snorkel tubes 30 and 32 will be open. Air enters and passes through compressor 24 where it is conveyed to the heat exchanger 28, picking up heat from the heat exchanger and passing through conduit 36 to conduit 38. At this point, since the tank is considered charged, valve C is closed and valve D is open, the air passing through the Stirling engine 12 and around the heater tubes 128 thereof to assist in driving the engine. As the air passes through the engine 12 fuel may be introduced and combustion made to occur to heat the heater tubes 128 and drive the engine. The gas is conveyed out of the engine 12 through conduit 54, valve E being closed to bypass the blower 22, and the gas passes through conduits 60, 58 and 50 to the turbine 26 which drives compressor 24, then through conduit 52 to the heat exchanger 28 and exhausted through outlet snorkel 32.

The final phase of the operation includes both surface running and recharging of the thermal storage tank 18. Under these conditions valves C and D are both open and the air passing from heat exchanger 28 through conduit 36 goes both to the engine 12 and to the burner 20 and finally into the tank 18. The outlet from tank 18, as well as the outlet from the engine 12, exhausts into conduit 50 leading to turbine 26 and the expanding gases drive the turbine 26 to operate the compressor 24. The gas passes into the heat exchanger 28 which exhausts to the atmosphere through snorkel conduit 32.

The following table illustrates the positions of valves A through G and the condition of the two burners in in accordance with the operation.

|  | Submerged | Surface Recharge | Surface Running | Surface Running and Recharging |
|---|---|---|---|---|
| Valve A | Closed | Open | Open | Open. |
| Valve B | do | do | do | Do. |
| Valve C | Open | do | Closed | Do. |
| Valve D | do | Closed | Open | Do. |
| Valve E | Down | Up | Up | Up. |
| Valve F | Up—Down | Up—Down | Immaterial | Up—Down. |
| Valve G | Right—Left | Right—Left | do | Right—Left. |
| Tank Burner | Off | On | Off | On. |
| Engine Burner | do | Off | On | Do. |

The operation of the system illustrated in FIGURE 2 is basically the same as that of FIGURE 1. During submerged operation valves T and U are closed and the air is circulated by blower 22 through the conduit 70 and into the tank 18. Air comes out of tank 18 through conduit 72 and passes to the engine 12 to operate the engine as above described. The air leaves engine 12 through conduit 74 and passes through conduit 78, where valve V is open, to conduit 68, and back through conduit 82, where valve Y is open, to the blower 22. Valve X is closed as is valve W. This operation continues until the heat in the thermal storage tank 18 is used up, at which point provision must be made to recharge the tank.

The recharging operation in the system illustrated in FIGURE 2 may be divided into three phases in order to maintain heat balance in the system during the beginning, middle and end of the recharge. For the beginning of the recharging operation valves T and U are open to receive and exhaust from the atmosphere. Compressor 24 is started by some exterior means and the air passes through heat exchanger 28 to conduit 68. Valve V is closed; valve W is open; valve X is open; valve Y is closed; valve Z is open. The tank burner 20 is on and the burner in the engine 12 is on. Under these conditions air passes through conduit 68 to the burner 20 where it passes through conduit 70 to the tank 18. The exhaust from the tank passes through conduit 72 to the engine 12 and also through conduit 84 to the blower 22. This permits relatively cool air to be introduced into the conduit 70 in case the burner temperature is too hot for the medium in the storage tank. The air is further heated in the Stirling engine 12 and exhausts through conduit 74 to the turbine 20 wherein it expands to drive compressor 24, and is passed to the heat exchanger 28 and out of the snorkel 66. It is also noted that there is a communication between conduit 68 and the Stirling engine 12 since valve W is open in conduit 89. This circuit furnishes most of the required fresh air (oxygen) to the engine since the gas from tank 72 will be mainly exhaust products low in oxygen content, during the initial recharge period.

Regulation of the various valves during the different phases of the recharging operation may be accomplished by reference to suitable temperature indicating devices located at various points in the system. Heat balance is easily maintained in the system in this manner.

The following table illustrates the valve positions and burner conditions during the various phases of the operation of the system illustrated in FIGURE 2.

|  | Submerged | Start Recharge | Middle Recharge | End Recharge |
|---|---|---|---|---|
| Valve T | Closed | Open | Open | Open. |
| Valve U | do | do | do | Do. |
| Valve V | Open | Closed | Closed | Closed. |
| Valve W | Closed | Open | Open | Open. |
| Valve X | do | do | do | Closed. |
| Valve Y | Open | Closed | do | Do. |
| Valve Z | Closed | Open | Open | Open. |
| Tank Burner | Off | On | On | On. |
| Engine Burner | do | do | Off | Off. |

Thus, a propulsion system is provided which is silent in operation, provides adequate power to propel a marine drive, has a broader range over presently known battery operated devices, and is widely adaptable to any size boat or craft. The propulsion system is simple and economical to operate, using recirculating air as the basic power plant operating medium and retaining enough heat in the system to provide adequate propulsion for an extended period of time.

What is claimed is:

1. A propulsion system for a submarine comprising a heat actuated propeller driving engine having a burner, heat storage means including a heat retaining medium connected by conduit means to said engine, a compressor for drawing air into said system from the atmosphere, a turbine for driving said compressor, conduit means between said compressor and said engine for conveying air thereto, said burner being operable to heat said air, for operating said engine, conduit means between said engine and said turbine for conveying air from said engine to said turbine and driving said turbine, and conduit means for exhausting air from said turbine to the atmosphere.

2. A propulsion system for a submarine comprising a heat actuated propeller driving engine, a burner associated with said engine for supplying heat to air circulating around said engine and operating said engine, heat storage means in said system, a conduit communicating between said heat storage means and said engine for conveying the air from said heat storage means to said engine, a compressor in said system for drawing in outside air for circulation through said system, a heat exchanger in said system and connected to said compressor by a conduit, said heat exchanger giving up heat to said air from said compressor for aiding in balancing said system, a conduit extending from said heat exchanger and communicating with said conduit between said heat storage means and said engine for conveying incoming air to said engine, a turbine operatively connected to said compressor for driving said compressor, conduit means between said engine and said turbine and between said heat storage means and said turbine for conveying air thereto and drive said turbine, and conduit means extending from said turbine through said heat exchanger and to the atmosphere to convey air through said heat exchanger and give up heat thereto and convey air to the atmosphere.

3. In a propulsion system for a submarine and comprising a heat actuated propeller driving engine having burner means, heat storage means adjacent said engine, a burner adjacent said heat storage means and connected thereto by conduit means, a conduit extending between said heat storage means and said engine and having valve means therein, a compressor for drawing air into said system from the atmosphere, a heat exchanger adjacent said compressor and connected thereto by conduit means, a conduit between said heat exchanger and said conduit extending between said heat storage means and said engine, said valve means being operable to divert the incoming air to said burner means of said engine when in one position for driving said engine and to divert the incoming air to said burner and said heat storage means when in a second position for recharging said heat storage means and to divert said air to said burner means of said engine and to said burner and said heat storage means when in a third position for both driving said engine and recharging said heat storage means, and conduit means extending from said engine and from said heat storage means to said turbine for driving said turbine and said compressor, and an exhaust conduit from said turbine to the atmosphere and through said heat exchanger and giving up heat to said heat exchanger to aid in balancing said system.

References Cited in the file of this patent

UNITED STATES PATENTS

| 2,159,758 | Diedrich | May 23, 1939 |
| 2,247,595 | Besler | July 5, 1941 |
| 2,596,057 | Van Heeckeren et al. | May 6, 1952 |
| 2,894,368 | Van Heeckeren | July 14, 1959 |
| 2,933,885 | Benedek et al. | Apr. 26, 1960 |